US012785444B2

(12) United States Patent
Mahmoud et al.

(10) Patent No.: US 12,785,444 B2
(45) Date of Patent: Nov. 3, 2026

(54) AIR COMPRESSION SOLAR ENERGY STORAGE SYSTEM AND METHOD FOR DESALINATION PLANTS

(71) Applicant: SAUDI WATER AUTHORITY, Riyadh (SA)

(72) Inventors: Amr Mohamed Mahmoud, Al-Jubail (SA); Ahmad Saeed Abdrahim Al Ghamdi, Al-Jubail (SA); Hussain Bassi, Al-Jubail (SA); Abdulrahman M. Mohammed, Al-Jubail (SA)

(73) Assignee: SAUDI WATER AUTHORITY, Riyadh (SA)

( * ) Notice: Subject to any disclaimer, the term of this patent is extended or adjusted under 35 U.S.C. 154(b) by 2 days.

(21) Appl. No.: 19/065,222

(22) Filed: Feb. 27, 2025

(65) Prior Publication Data

US 2025/0273990 A1 Aug. 28, 2025

Related U.S. Application Data

(60) Provisional application No. 63/558,809, filed on Feb. 28, 2024.

(51) Int. Cl.

| | |
|---|---|
| ***H02J 15/20*** | (2026.01) |
| ***B01D 61/10*** | (2006.01) |
| ***F01K 27/00*** | (2006.01) |
| ***H02J 15/00*** | (2006.01) |

(52) U.S. Cl.

CPC .............. *H02J 15/20* (2026.01); *B01D 61/10* (2013.01); *F01K 27/00* (2013.01); *H02J 15/00* (2013.01); *B01D 2313/367* (2022.08)

(58) Field of Classification Search

CPC . H02J 15/20; B01D 2313/367; Y02A 20/212; Y02W 10/37; C02F 1/14; C02F 1/441

See application file for complete search history.

(56) References Cited

U.S. PATENT DOCUMENTS 5,004,535 A * 4/1991 Bosko .................... B01D 61/10 210/90

7,964,787 B2 * 6/2011 Jaisinghani ............. H02S 10/10 136/244

(Continued)

FOREIGN PATENT DOCUMENTS

CN 102311149 1/2012

CN 203229405 10/2013

(Continued)

*Primary Examiner* — Thomas E Lazo

(74) *Attorney, Agent, or Firm* — Norton Rose Fulbright US LLP

(57) ABSTRACT

A system and method for movement of a liquid that may contain and use a photovoltaic cell, gas compressor electrically connected to the photovoltaic cell and fluidly connected to a compressed gas storage vessel, compressed air-driven motor and/or compressed air-driven pump fluidly connected to the compressed gas storage vessel. The system may contain a conduit for a liquid fluidly connected to the compressed air-driven motor and/or a compressed air-driven pump. A compressed gas turbo-pump system may contain and use a compressed gas turbo-pump containing a turbine fluidly connected to a compressed gas inlet and a gas outlet, one or more gears capable of being mechanically connected to the turbine and reducing speed and increasing the torque of a second gear and/or of a shaft as compared to a speed and torque of the turbine, and/or a liquid pump capable of being driven by the second gear and/or the shaft.

20 Claims, 1 Drawing Sheet

(56) References Cited

U.S. PATENT DOCUMENTS

| | | | | |
|---|---|---|---|---|
| 8,425,779 | B2 | 4/2013 | Stark | |
| 9,267,492 | B2 * | 2/2016 | Pavlov | F03D 9/255 |
| 10,408,128 | B2 * | 9/2019 | Mokheimer | B01D 1/0058 |
| 10,823,135 | B2 | 11/2020 | Bassi et al. | |
| 2012/0286522 | A1 * | 11/2012 | Stahlkopf | F04B 49/22 290/1 R |
| 2019/0351749 | A1 * | 11/2019 | Domes | B60K 3/04 |
| 2023/0344383 | A1 * | 10/2023 | Krasnoff | H02S 40/22 |
| 2024/0001301 | A1 * | 1/2024 | Traverso | C02F 1/441 |

FOREIGN PATENT DOCUMENTS

| | | | | |
|---|---|---|---|---|
| CN | 103993920 | | 8/2014 | |
| CN | 204169004 | | 2/2015 | |
| CN | 103112927 | | 4/2015 | |
| CN | 104671354 | | 6/2015 | |
| CN | 204569496 | | 8/2015 | |
| CN | 106277126 | | 1/2017 | |
| CN | 212450721 | | 2/2021 | |
| CN | 113292123 | | 8/2021 | |
| CN | 113292123 | A * | 8/2021 | C02F 1/08 |
| CN | 114716088 | A * | 7/2022 | C02F 1/441 |
| CN | 115371267 | | 11/2022 | |
| CN | 116928026 | | 10/2023 | |
| DE | 202007012834 | | 7/2008 | |
| KR | 102136541 | | 7/2020 | |
| MX | 2016001468 | | 7/2016 | |
| WO | WO 2008/106808 | | 9/2008 | |
| WO | WO 2014/136134 | | 9/2014 | |
| WO | WO 2017/054068 | | 4/2017 | |
| WO | WO 2021/070041 | | 4/2021 | |

* cited by examiner

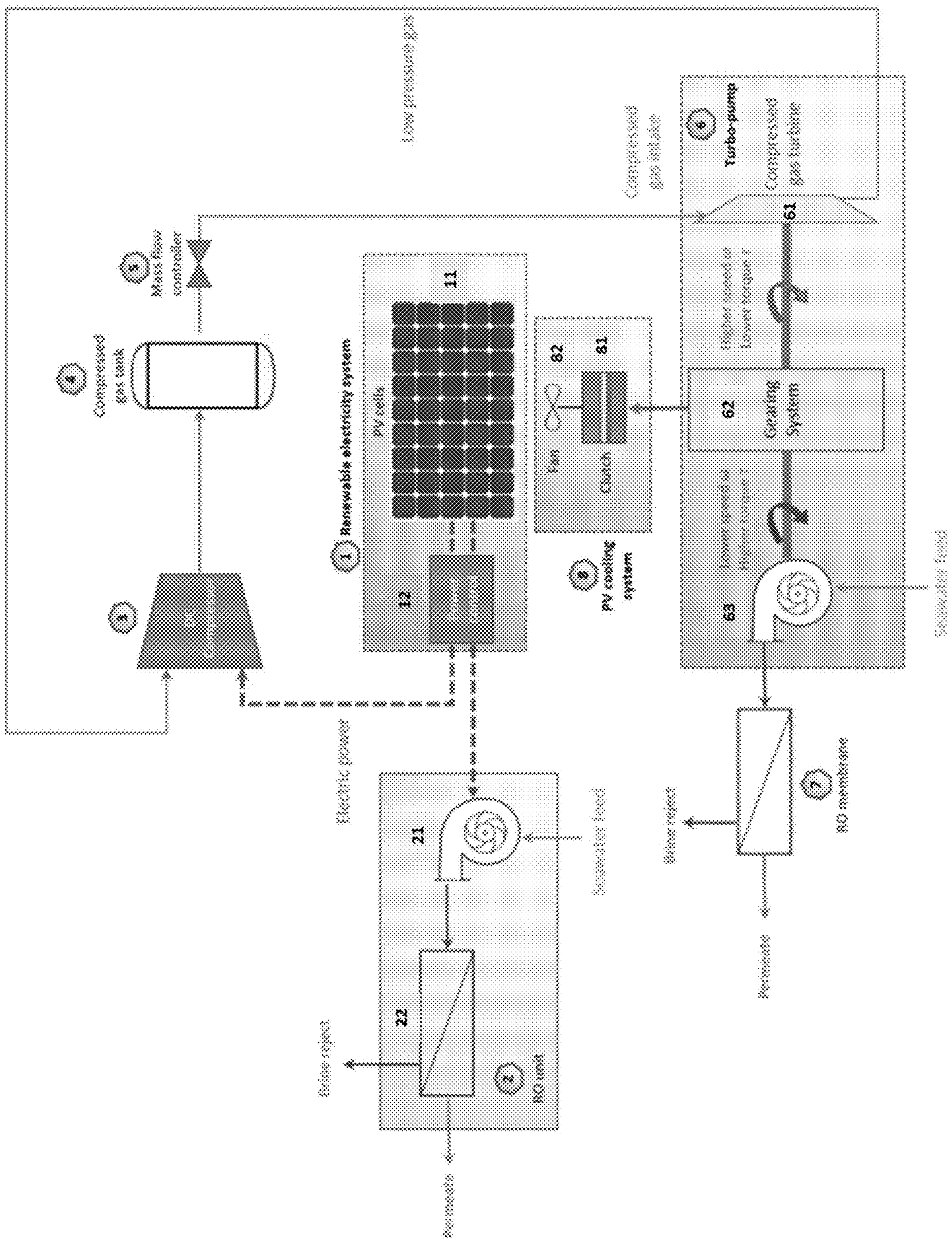
Compressed gas tank
Mass flow controller
Renewable electricity system
PV cells
11
12
Electric power
PV cooling system
Fan
Clutch
82
81
62
Gearing System
Turbo-pump
Compressed gas turbine
Compressed gas intake
61
63
21
22
RO unit
RO membrane
Brine reject

AIR COMPRESSION SOLAR ENERGY STORAGE SYSTEM AND METHOD FOR DESALINATION PLANTS

CROSS REFERENCE TO RELATED APPLICATIONS

This application claims the benefit of priority of U.S. Provisional Patent Application No. 63/558,809, filed Feb. 28, 2024, which is hereby incorporated by reference in its entirety.

BACKGROUND OF THE INVENTION

A. Field of the Invention

The invention generally relates to a system and method for movement of a liquid, and in particular a system and method for improving energy efficiency by integrating a photovoltaic unit with a compressed air storage unit to utilize the stored compressed air as an energy source for movement of a liquid.

B. Description of Related Art

Freshwater is produced in the desalination industry through various processes that convert seawater, brackish water, and other salty waters into fresh water. Most references to "seawater," "saline water," or "feed water" as the source water are made for ease of reference. These references are not meant to be limiting, as the source water can be any saline water recognized as possible feed water to a desalination facility by those of ordinary skill in the art.

A primary obstacle to increased production of fresh water is the power requirement to separate salts from feed water. The amount of freshwater that can be produced from seawater is limited by the amount of energy required. Typical desalination plants require intensive power consumption, such as between 3-4 kwh/$m^3$ for reverse osmosis methods and up to 17 kwh/$m^3$ for thermal energy methods.

Solar energy storage plays a pivotal role in maximizing the efficiency and reliability of solar power systems as well as reducing pollution and carbon dioxide production. As solar energy generation is intermittent, with its peak production during daylight hours, efficient storage solutions are critical for utilizing surplus energy and providing a consistent power supply. Energy storage technologies like batteries, pumped hydro, thermal storage, and newer innovations such as hydrogen enable the capture and retention of excess energy for use during periods of low or no sunlight. While these technologies promise to revolutionize renewable energy integration, they also pose economic challenges. The initial cost of implementing storage systems, especially for large-scale applications, remains a significant hurdle. Additionally, the lifespan and efficiency of storage solutions can be a limiting factor.

Many studies have been conducted to optimize the power requirements and sources of power of desalination units in order to improve production and economics, but thermodynamics and process requirements have thwarted these efforts. As a result, there is a need for an approach that efficiently produces, stores, and uses power without sacrificing production.

SUMMARY OF THE INVENTION

Applicants have found a solution to some of the above-mentioned problems. Methods and systems that can use renewable power, can increase the reliability of renewable power, and reduce the cost of produced water are described herein. In some instances, the methods and systems are used in desalinating water and/or on desalinated water. The methods and systems may include a photovoltaic cell (e.g., solar energy convertor), a gas compressor electrically connected to the photovoltaic cell that is capable of powering the gas compressor to compress gas, a compressed gas storage vessel fluidly connected to the gas compressor that is capable of storing in the compressed gas, a compressed air-driven motor and/or a compressed air-driven pump fluidly connected to the compressed gas storage vessel and capable of being driven by the compressed air, and/or a conduit for a liquid fluidly connected to the compressed air-driven motor and/or a compressed air-driven pump that is capable of moving the liquid through the conduit. In some instances, the methods and/or systems are capable of running continuously day and night using solar and compressed gas power sources without power fluctuations. Also disclosed is a compressed gas turbo-pump system. The compressed gas turbo-pump system may contain and/or use a compressed gas turbo-pump containing a turbine fluidly connected to a compressed gas inlet and a gas outlet, one or more gears capable of being mechanically connected to the turbine and reducing speed and increasing torque of a second gear and/or of a shaft as compared to a speed and torque of the turbine, and/or a liquid pump capable of being driven by the second gear and/or the shaft.

This approach may significantly reduce the non-renewable power requirements for movement of a liquid, such as is required for water purification. These benefits may lower the amount of $CO_2$ emissions and the environmental impact of a plant using the system, such as a desalination plant.

Process efficiency may be improved further in the current system by integrating an automated switch of the energy flow between the photovoltaic cell and the gas compressor. The integrated system for moving water and energy storage may be powered entirely by solar energy. Compressed gas may be utilized and has smaller volume requirements and fewer losses due to friction than some other forms of energy storage. The compressed air may drive a compressed air engine and/or a dual fluid phase turbo-pump. In some instances, the turbo-pump includes a direct drive pump that may help maximum energy conversion efficiency. The use of an air nozzle may help eliminate energy transmission losses when coupling stored energy in the form of compressed gas to mechanical movement, such as movement of a pump cylinder, spring(s), gear(s), etc.

In some aspects, a system for the movement of a liquid by harvesting energy through solar cells integrated with a compressed gas storage vessel is described. In some instances, the compressed gas stored in the compressed gas storage vessel is capable of driving a compressed air-driven motor and/or a compressed air-driven pump. The system may include a photovoltaic cell, a gas compressor electrically connected to the photovoltaic cell wherein energy harvested by the photovoltaic cell is capable of powering the gas compressor to compress the gas, a compressed gas storage vessel fluidly connected to the gas compressor wherein compressed gas compressed by the gas compressor is capable of being stored in the compressed gas storage vessel, and a compressed air-driven motor and/or a compressed air-driven pump fluidly connected to the compressed gas storage vessel wherein compressed gas from the compressed gas storage vessel is capable of driving the compressed air-driven motor and/or a compressed air-driven pump.

In some aspects, the system further comprises a conduit for a liquid fluidly connected to the compressed air-driven motor and/or a compressed air-driven pump, wherein the compressed air-driven motor and/or a compressed air-driven pump is capable of moving the liquid through the conduit.

In some aspects, the system further comprises a desalination unit fluidly connected to the conduit. In some aspects, the system may include one or more ultra-filtration membrane, nano-filtration membrane, reverse osmosis membrane, and/or a forward osmosis membrane. In some aspects, the system may include one or more forward osmosis membrane and/or reverse osmosis membrane. In some instances, the system may include a reverse osmosis membrane. In some instances, the system may include a forward osmosis membrane.

In some aspects, the system comprises a photovoltaic unit comprising the photovoltaic cell. In some aspects, the system comprises a photovoltaic cell cooling unit. In some aspects, the photovoltaic cell cooling unit is capable of being driven/powered by the compressed air-driven motor and/or the compressed air-driven pump. In some aspects, the photovoltaic cell cooling unit may include a clutch. In some instances, the clutch is capable of disconnecting the photovoltaic cell cooling unit from the movement of the compressed air-driven motor and/or the compressed air-driven pump. In some instances, the clutch may control the speed of a cooling fan.

In some aspects, the system further comprises one or more gears capable of being mechanically connected to the compressed air-driven motor and/or the compressed air-driven pump. In some instances, the one or more gears are capable of reducing speed and increasing the torque of a second gear and/or of a shaft as compared to a speed and torque of the compressed air-driven motor and/or the compressed air-driven pump. In some aspects, the second gear and/or the shaft are capable of being mechanically connected to the one or more gears. In some aspects, the second gear and/or shaft is capable of driving a pump for pumping a liquid. In some aspects, the second gear and/or shaft is capable of moving a liquid. In some aspects, the second gear and/or shaft is capable of driving/powering a photovoltaic cell cooling unit. In some aspects, the second gear and/or shaft is capable of driving/powering a cooling fan.

In some instances, at least a portion of the electricity harvested by the photovoltaic cell is configured to power an electrical pump for pumping a liquid. In some instances, at least a portion of the electricity harvested by the photovoltaic cell is configured to power an electrical fan. In some instances, the fan is configured to cool a photovoltaic cell. In some instances, at least a portion of the electricity harvested by the photovoltaic cell is configured to power the gas compressor.

In another aspect, a method for the movement of a liquid using the system described herein is disclosed. The method may include the steps of:

- producing energy using a photovoltaic cell;
- compressing a gas using a gas compressor powered by the energy;
- storing the compressed gas in a compressed gas storage vessel; and
- moving a liquid by driving a compressed air-driven motor and/or a compressed air-driven pump using the compressed gas sourced from the compressed gas storage vessel.

In some instances, the system for the movement of a liquid is used in the method described herein. In some instances, the compressed gas turbo-pump system is used in the method described herein.

In some instances, the liquid is moved by the method in and/or into a desalination system. In some instances, the desalination system may include one or more desalination unit, such as a forward osmosis membrane and/or reverse osmosis membrane.

In some aspects, the method further includes cooling the photovoltaic cell by driving a photovoltaic cell cooling unit by the compressed air-driven motor and/or the compressed air-driven pump. In some instances, the photovoltaic cell cooling unit may include a clutch capable of disconnecting the photovoltaic cell cooling unit from the movement of the compressed air-driven motor and/or the compressed air-driven pump. In some instances, the compressed air-driven motor and/or the compressed air-driven pump drive a cooling fan. In some instances, the clutch can control the speed of the cooling fan.

In some aspects, the method further comprises the use of one or more gears capable of being mechanically connected to the compressed air-driven motor and/or the compressed air-driven pump. In some instances, the one or more gears reduces speed and increases the torque of a second gear and/or of a shaft as compared to a speed and torque of the compressed air-driven motor and/or a compressed air-driven pump. In some instances, the second gear and/or the shaft are capable of being mechanically connected to the one or more gears. In some instances, the second gear and/or the shaft drive a pump to move a liquid. In some instances, the one or more gears drive a pump to move a liquid.

In some aspects, the method includes using at least a portion of the electricity produced by the photovoltaic cell to drive a pump to move a liquid. In some instances, at least a portion of the electricity harvested by the photovoltaic cell powers an electrical fan. In some instances, the fan cools a photovoltaic cell. In some instances, at least a portion of the electricity harvested by the photovoltaic cell powers the gas compressor.

In another aspect, a compressed gas turbo-pump system is disclosed herein. The compressed gas turbo-pump system may include:

- a photovoltaic cell;
- a gas compressor electrically connected to the photovoltaic cell, wherein energy harvested by the photovoltaic cell is capable of powering the gas compressor to compress gas;
- a compressed gas storage vessel fluidly connected to the gas compressor, wherein compressed gas compressed by the gas compressor is capable of being stored in the compressed gas storage vessel, and wherein the compressed gas storage vessel is fluidly connected to the compressed gas inlet of a compressed gas turbo-pump;
- the compressed gas turbo-pump comprising:
  - a compressed gas inlet;
  - a turbine fluidly connected to the compressed gas inlet; and
  - a gas outlet fluidly connected to the turbine;
- one or more gears capable of being mechanically connected to the turbine and reducing speed and increasing torque of a second gear and/or of a shaft as compared to a speed and torque of the turbine, the second gear and/or the shaft capable of being mechanically connected to the one or more gears; and
- a liquid pump capable of being driven by the movement of the second gear and/or the shaft.

In some aspects, the compressed gas turbo-pump system is part of the system for the movement of a liquid described herein and/or is used in the method for the movement of a liquid described herein.

In some aspects, the compressed gas turbo-pump system further includes a photovoltaic cell cooling unit. In some instances, the photovoltaic cell cooling unit is capable of being driven by movement of the turbine, the one or more gears, the second gear, and/or the shaft. In some instances, a fan is capable of being driven by movement of the turbine, the one or more gears, the second gear, and/or the shaft. In some instances, the photovoltaic cell cooling unit comprises a clutch. In some instances, the clutch is capable of disconnecting the photovoltaic cell cooling unit from the turbine, the one or more gears, the second gear, and/or the shaft. In some instances, the clutch can control the speed of a cooling fan.

Also disclosed are the following Aspects 1 to 25 of the present invention.

Aspect 1 is a system for movement of a liquid, the system comprising:
- a photovoltaic cell;
- a gas compressor electrically connected to the photovoltaic cell, wherein energy harvested by the photovoltaic cell is capable of powering the gas compressor to compress gas;
- a compressed gas storage vessel fluidly connected to the gas compressor, wherein compressed gas compressed by the gas compressor is capable of being stored in the compressed gas storage vessel;
- a compressed air-driven motor and/or a compressed air-driven pump fluidly connected to the compressed gas storage vessel, wherein compressed gas from the compressed gas storage vessel is capable of driving the compressed air-driven motor and/or a compressed air-driven pump.

Aspect 2 is the system of Aspect 1, further comprising a conduit for a liquid fluidly connected to the compressed air-driven motor and/or a compressed air-driven pump, wherein the compressed air-driven motor and/or a compressed air-driven pump is capable of moving the liquid through the conduit, and optionally a desalination unit fluidly connected to the conduit.

Aspect 3 is the system of Aspect 2, wherein the desalination unit comprises one or more ultra-filtration membrane, nano-filtration membrane, reverse osmosis membrane, and/or a forward osmosis membrane.

Aspect 4 is the system of Aspect 3, comprising one or more forward osmosis membrane and/or reverse osmosis membrane.

Aspect 5 is the system of any one of Aspects 1 to 4, comprising a photovoltaic unit comprising the photovoltaic cell and a photovoltaic cell cooling unit.

Aspect 6 is the system of Aspect 5, wherein the photovoltaic cell cooling unit is capable of being driven by the compressed air-driven motor and/or the compressed air-driven pump.

Aspect 7 is the system of Aspect 6, wherein the photovoltaic cell cooling unit comprises a clutch capable of disconnecting the photovoltaic cell cooling unit from the movement of the compressed air-driven motor and/or a compressed air-driven pump and optionally where the clutch can control the speed of a cooling fan.

Aspect 8 is the system of any one of Aspects 1 to 7, further comprising one or more gears capable of being mechanically connected to the compressed air-driven motor and/or a compressed air-driven pump and reducing speed and increasing torque of a second gear and/or of a shaft as compared to a speed and torque of the compressed air-driven motor and/or a compressed air-driven pump, the second gear and/or the shaft capable of being mechanically connected to the one or more gears.

Aspect 9 is the system of Aspect 8, wherein the second gear and/or shaft is capable of driving a pump for pumping a liquid.

Aspect 10 is the system of any one of Aspects 1 to 9, wherein at least a portion of the energy harvested by the photovoltaic cell is configured to drive a pump for pumping a liquid.

Aspect 11 is a method for movement of a liquid, the method comprising:
- producing energy using a photovoltaic cell;
- compressing a gas using a gas compressor powered by the energy;
- storing the compressed gas in a compressed gas storage vessel; and
- moving a liquid by driving a compressed air-driven motor and/or a compressed air-driven pump using the compressed gas sourced from the compressed gas storage vessel.

Aspect 12 is the method of Aspect 11, wherein the liquid is moved by the method in and/or into a desalination unit.

Aspect 13 is the method of Aspect 12, wherein the desalination unit comprises one or more forward osmosis membrane and/or reverse osmosis membrane.

Aspect 14 is the method of any one of Aspects 11 to 13, further comprising cooling the photovoltaic cell by driving a photovoltaic cell cooling unit by the compressed air-driven motor and/or the compressed air-driven pump.

Aspect 15 is the method of Aspect 14, wherein the photovoltaic cell cooling unit comprises a clutch capable of disconnecting the photovoltaic cell cooling unit from movement of the compressed air-driven motor and/or the compressed air-driven pump and optionally where the clutch can control the speed of a cooling fan.

Aspect 16 is the method of any one of Aspects 11 to 15, further comprising one or more gears capable of being mechanically connected to the compressed air-driven motor and/or a compressed air-driven pump and reducing speed and increasing torque of a second gear and/or of a shaft as compared to a speed and torque of the compressed air-driven motor and/or a compressed air-driven pump, the second gear and/or the shaft capable of being mechanically connected to the one or more gears.

Aspect 17 is the method of Aspect 16, wherein the second gear and/or the shaft drives a pump to move a liquid.

Aspect 18 is the method of any one of Aspects 11 to 17, wherein at least a portion of the energy produced by the photovoltaic cell drives a pump to move a liquid.

Aspect 19 is a compressed gas turbo-pump system comprising:
- a photovoltaic cell;
- a gas compressor electrically connected to the photovoltaic cell, wherein energy harvested by the photovoltaic cell is capable of powering the gas compressor to compress gas;
- a compressed gas storage vessel fluidly connected to the gas compressor, wherein compressed gas compressed by the gas compressor is capable of being stored in the compressed gas storage vessel, and wherein the compressed gas storage vessel is fluidly connected to the compressed gas inlet of a compressed gas turbo-pump;

the compressed gas turbo-pump comprising:

a compressed gas inlet;

a turbine fluidly connected to the compressed gas inlet; and a gas outlet fluidly connected to the turbine;

one or more gears capable of being mechanically connected to the turbine and reducing speed and increasing torque of a second gear and/or of a shaft as compared to a speed and torque of the turbine, the second gear and/or the shaft capable of being mechanically connected to the one or more gears; and a liquid pump capable of being driven by the movement of the second gear and/or the shaft.

Aspect 20 is the compressed gas turbo-pump system of Aspect 19, further comprising a photovoltaic cell cooling unit capable of being driven by movement of the turbine, the one or more gears, the second gear, and/or the shaft, optionally where the photovoltaic cell cooling unit comprises a clutch capable of disconnecting the photovoltaic cell cooling unit from the turbine, the one or more gears, the second gear, and/or the shaft, and where the clutch can control the speed of a cooling fan.

Aspect 21 is the system of any one of Aspects 1 to 10 for use in the method of any one of Aspects 11 to 18.

Aspect 22 is the method of any one of Aspects 11 to 18, comprising using the system of any one of Aspects 1 to 10 and/or the compressed gas turbo-pump system of any one of Aspects 19 or 20.

Aspect 23 is the system of any one of Aspects 1 to 10, wherein the system comprises the compressed gas turbo-pump system of any one of Aspects 19 or 20.

Aspect 24 is the compressed gas turbo-pump system of any one of Aspects 19 or 20, wherein the the compressed gas turbo-pump system comprise the system of any one of Aspects 1 to 10.

Aspect 25 is the compressed gas turbo-pump system of any one of Aspects 19 or 20 for use in the method of any one of Aspects 11 to 18.

The terms "about" or "approximately" as used herein are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" can include "and" or "or." To illustrate, A, B, and/or C can include: A alone, B alone, C alone, a combination of A and B, a combination of A and C, a combination of B and C, or a combination of A, B, and C.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following FIGURES, detailed description, and examples. It should be understood, however, that the FIGURES, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

FIGURE is a schematic illustration of a proposed system for the movement of a liquid.

DETAILED DESCRIPTION OF THE INVENTION

A method and systems for the movement of a liquid are described herein. The methods and systems may be used in desalinating water or on desalination plants. The methods and systems may include a photovoltaic cell (e.g., solar energy convertor), a gas compressor electrically connected to the photovoltaic cell that is capable of powering the gas compressor to compress gas, a compressed gas storage vessel fluidly connected to the gas compressor that is capable of storing compressed gas, and a compressed air-driven motor and/or a compressed air-driven pump fluidly connected to the compressed gas storage vessel that is capable of being driven by the compressed air. In some embodiments, the system further comprises a conduit for a liquid fluidly connected to the compressed air-driven motor and/or a compressed air-driven pump, where the compressed air-driven motor and/or a compressed air-driven pump is capable of moving the liquid through the conduit. The methods and systems may include a desalination unit fluidly connected to the conduit. Also disclosed is a compressed gas turbo-pump system. The compressed gas turbo-pump system may contain and/or use a compressed gas turbo-pump containing a turbine fluidly connected to a compressed gas inlet and a gas outlet, one or more gears capable of being mechanically connected to the turbine and reducing speed and increasing torque of a second gear and/or of a shaft as compared to a speed and torque of the turbine, and/or a liquid pump capable of being driven by the second gear and/or the shaft. This integrated solar-powered desalination and energy storage system may reduce the fluctuation of the system's flow and/or power used to drive the system. In some instances, the methods and/or systems are capable of maintaining consistent power during the day and night. In some instances, the methods and/or systems are capable of reducing the carbon dioxide produced by a process using the system.

These and other non-limiting aspects of the present invention are discussed in further detail in the following sections.

A. System for Movement of a Liquid

The FIG. 1*s* a schematic illustration of a non-limiting example of a system for movement of a liquid in accordance with the present invention. It discloses the use of renewable electricity sources such as photovoltaic (PV) unit 1, and demonstrates how the electricity generated through PV unit 1 may be used to operate a reverse osmosis (RO) unit 2 and/or a gas compressor 3. The system also discloses a compressed gas storage vessel 4 to store the compressed gas produced by the gas compressor 3. The compressed gas flow from the compressed gas storage vessel 4 may be regulated through a control valve 5 to operate a compressed gas powered motor and/or compressed gas powered pump, turbo pump/motor 6, which in turn operates a RO unit 7. In some instances, the RO unit 2 and the RO unit 7 are the same unit, and electrical power and/or compressed gas power may be used to power at least one of the pumps for the RO units, may be used to run separate pumps, and/or may be switched to power a same pump. In some aspects, the RO unit 2 and the RO unit 7 are different units. In some aspects, the system switches between use of the direct PV energy-operated RO unit 2 and the compressed gas-operated RO unit 7. In some instances, both the direct PV energy-operated RO unit 2 and the compressed gas-operated RO unit 7 are run at the same time. In some instances, the switching may maximize the efficient use of the harvested solar energy.

The proposed system may comprise five primary subsystems, as shown in the FIGURE. The solar photovoltaic (PV) system may contain the PV unit 1. The PV unit 1 may have high-efficiency PV panels 11 to convert solar energy into electricity. In some instances, the PV panels serve as the primary energy source for the entire system. The PV unit 1 may contain a power management system 12. The power management system 12 may optimize energy allocation between a desalination unit such as the RO unit 2 and a compressed air energy storage (CAES) subsystem such as the gas compressor 3 and corresponding compressed gas storage vessel 4, ensuring efficient utilization of the generated power. The power management system 12 may be automated in some instances.

The desalination subsystems, such as RO unit 2 and RO unit 7 may contain high-pressure reverse osmosis (RO) membranes, such as membrane 22 to remove contaminants and impurities from a water source, such as seawater. In some instances, the RO units contain a pump, such as pump 63 and/or pump 21 to move an solution through the RO membrane. In some instances, the RO units produce clean drinking water. In some instances, advanced RO technology ensures optimal filtration efficiency, maximizing clean water production.

The compressed air energy storage (CAES) subsystem, may include a high-efficiency compressor as the gas compressor 3. The gas compressor may utilize at least part of the electricity generated by the PV unit to compress a gas, such as air and store potential energy for future utilization. A robust, high-pressure tank may be included as the compressed gas storage vessel 4. The compressed gas storage vessel 4 may safely store the compressed air until needed.

The control valve 5 may be a mass flow controller (MFC). The control valve 5 may regulate the release of compressed air from the compressed gas storage vessel 4. The control valve 5 may be automated in some instances. The automation of the control valve may ensure optimal energy utilization.

A turbo pump/motor 6 may contain a turbo-pump unit. The turbo pump/motor 6 may utilize the expanding compressed air to drive a turbine 61, The turbo pump/motor 6 and/or turbine 61 may generate mechanical movement to drive a pump 63. In some instances, the system can be configured to drive either a seawater feed pump or a high-pressure RO pump, depending on the desired output. In some instances, the turbo pump/motor 6 may contain a gearing mechanism 62 to change the torque and/or speed between the turbine 61 and other components driven by the turbo pump/motor 6.

A PV cooling subsystem 8 may also be included in the system. The PV cooling subsystem 8 may include a clutch system 81 and/or a gearing mechanism. In some instances, the PV cooling subsystem 8 may facilitate efficient PV panel 11 cooling by utilizing the power from the turbo pump/motor 6. The PV cooling subsystem 8 may contain a fan 82 to cool the PV unit 1. In some instances, the fan 82 is connected to the clutch 81. In some instances, the fan 82 flows forced air to the back of the PV panel 11 to cool the PV panel 11.

The system for the movement of a liquid herein may include additional tanks, pumps, valves, discharge tanks, piping, etc. The system for the movement of a liquid can further be coupled to a water purification system. The system for the movement of a liquid can provide pressurized water. The system for the movement of a liquid can provide power to the water purification system and also it can receive water and/or concentrated saline from the water purification system.

Water purification operating units may be coupled to the system for the movement of a liquid. The water purification operations may include one or more of a reverse osmosis membrane system, a forward osmosis membrane system, a multi-stage flash system, a multiple effect distillation system, and/or an electrodialysis system, or any other desalination process. In some instances, the water purification operations include treatments like carbon dioxide addition, limestone contactor, or a combination thereof.

In some aspects, the source of water for the system for the movement of a liquid may include industrial water, recycled waste water, brackish ground water, surface water, stormwater, reclaimed water, and/or a mixture thereof.

Use of multiple systems for the movement of a liquid to normalize flow and/or energy is disclosed herein.

The system may include an automatic switch that can control one or more of the flow valves. The automatic switch may include a sensor, a central processing unit, one or more motors, and/or a user interface, etc. In some instances, the sensors include one or more pressure sensors, one or more flow sensors, one or more sensors to detect an electrical property such as voltage or current, and/or one or more fouling detectors, etc.

B. Compressed Gas Turbo-Pump System

In some aspects, a compressed gas turbo-pump system is described herein. The FIGURE provides a non-limiting example of a compressed gas turbo-pump system.

The compressed gas turbo-pump system may be part of the system for moving a liquid described. The compressed gas turbo-pump system may contain: a photovoltaic cell, such as one in the photovoltaic (PV) unit 1; a gas compressor electrically connected to the photovoltaic cell, such as the gas compressor 3; a compressed gas storage vessel fluidly connected to the gas compressor, such as compressed gas storage vessel 4; and a compressed gas turbo-pump fluidly connected to the compressed gas storage vessel, such as the turbo pump/motor 6.

In some aspects, the compressed gas turbo-pump includes a compressed gas inlet, a turbine fluidly connected to the compressed gas inlet, such as turbine 61, and a gas outlet fluidly connected to the turbine. In some aspects, the compressed gas turbo-pump system includes and/or is capable of being mechanically connected to one or more gears, such as gears in the gearing mechanism 62. In some instances, the gears reducing speed and/or increasing torque of a second gear and/or of a shaft as compared to the speed and torque of the turbine. In some instances, the second gear and/or the shaft is capable of being mechanically connected to the one or more gears.

In some instances, the compressed gas turbo-pump system includes and/or is capable of being mechanically connected to a liquid pump, such as pump 63. In some instances, the pump is capable of being driven by the movement of the second gear and/or the shaft.

In some instances, the compressed gas turbo-pump system further comprises a photovoltaic cell cooling unit capable of being driven by movement of the turbine, the one or more gears, the second gear, and/or the shaft, such as PV cooling subsystem 8. In some instances, the photovoltaic cell cooling unit comprises a clutch capable of disconnecting the photovoltaic cell cooling unit from the turbine, the one or more gears, the second gear, and/or the shaft, such as clutch system 81. In some instances, the photovoltaic cell cooling unit contains a cooling fan, such as fan 82. In some instances, the clutch can control the speed of the cooling fan.

C. Method for Movement of a Liquid

In some instances, a method for the movement of liquid is disclosed herein. In some instances, the method uses the compressed gas turbo-pump system and/or the system for moving a liquid described. In some instances, the method includes harvesting energy using a system described herein. In some instances, the method can include the steps of producing electricity using a photovoltaic cell, compressing a gas using a gas compressor powered by the electricity from the PV cell, storing the compressed gas in a compressed gas storage vessel; and moving a liquid by driving a compressed air-driven motor and/or a compressed air-driven pump using the compressed gas sourced from the compressed gas storage vessel.

In some aspects, the method includes using a part of the electricity generated from PV cells to power a pump, such as a high-pressure pump in the Reverse Osmosis (RO) system and another part of the electricity powers the gas compressor.

In some instances, the compressed air-driven motor and/or a compressed air-driven pump contains a turbine that is rotated by movement of the compressed air (e.g., by decompressing the compressed air). The compressed air may generate high-speed and/or low torque of the turbine. In some instances, a gearing system uses the rotation of the turbine to modify the speed and torque of gear, second gear, rod, shaft, etc. so that it lowers the speed but increases the torque of the gear, second gear, rod, shaft, etc. In some instances, the gearing system operates a pump, cooling system, fan, clutch, etc. . . . .

In some aspects, the method may use a clutch system mechanically connected to the gearing system, or directly to the turbine, gear, another gear, rod, etc. to control the movement of a pump, cooling system, fan, etc.

In some aspects, the liquid is moved by the method in, into, and/or out of a desalination unit or a desalination plant. In some aspects, the desalination unit comprises one or more forward osmosis membrane and/or reverse osmosis membrane.

In some aspects, the method further comprises cooling the photovoltaic cell by driving a photovoltaic cell cooling unit by the compressed air-driven motor and/or a the compressed air-driven pump. In some aspects of the method, the photovoltaic cell cooling unit includes a clutch capable of disconnecting the photovoltaic cell cooling unit from movement of the compressed air-driven motor and/or the compressed air-driven pump. In some instances, the clutch can control the speed of a cooling fan.

D. Uses of System and Method

These systems and methods may reduce the fluctuation of flow and/or power for a system disclosed herein. The systems and methods have many applications, such as in the field of advanced water treatment like desalination plants. In some instances, the applications include drinking water treatment, wastewater treatment, and/or reclaimed water treatment. For example, mitigating power failures when using renewable energy sources. The systems and methods disclosed herein also provide for an environmentally friendly process to minimize $CO_2$ emissions by utilizing clean and renewable solar energy, minimizing dependence on fossil fuels, and reducing carbon emissions.

In some instances, the applications include improved energy management. For example, the systems and methods herein may allow for temporal energy shifting, storage, and maximizing the utilization of intermittent solar energy. The flexible configurations of the systems may be adapted to different operational conditions and output requirements and offer potential for large-scale implementation and widespread application.

The invention claimed is:

1. A system for movement of a liquid, the system comprising:

a photovoltaic unit comprising a photovoltaic cell and a photovoltaic cell cooling unit, wherein the photovoltaic cell cooling unit comprises a clutch and a fan, and wherein the fan is connected to the clutch;

a gas compressor electrically connected to the photovoltaic cell, wherein energy harvested by the photovoltaic cell is capable of powering the gas compressor to compress gas;

a compressed gas storage vessel fluidly connected to the gas compressor, wherein compressed gas compressed by the gas compressor is capable of being stored in the compressed gas storage vessel;

a compressed air-driven motor and/or a compressed air-driven pump fluidly connected to the compressed gas storage vessel and mechanically connected to the photovoltaic cell cooling unit, wherein compressed gas from the compressed gas storage vessel is capable of driving the compressed air-driven motor and/or the compressed air-driven pump, and the compressed air-driven motor and/or the compressed air-driven pump is capable of driving the photovoltaic cell cooling unit, and wherein the clutch is capable of disconnecting the photovoltaic cell cooling unit from movement of the compressed air-driven motor and/or the compressed air-driven pump.

2. The system of claim 1, further comprising:

a conduit for a liquid fluidly connected to the compressed air-driven motor and/or a compressed air-driven pump, and a desalination unit fluidly connected to the conduit, wherein the compressed air-driven motor and/or a compressed air-driven pump is capable of moving the liquid through the conduit.

3. The system of claim 2, wherein the desalination unit comprises one or more ultra-filtration membrane, nano-filtration membrane, reverse osmosis membrane, and/or a forward osmosis membrane.

4. The system of claim 3, comprising one or more forward osmosis membrane and/or reverse osmosis membrane.

5. The system of claim 1, wherein the clutch is capable of controlling speed of the fan.

6. The system of claim 1, further comprising one or more gears capable of being mechanically connected to the compressed air-driven motor and/or a compressed air-driven pump and reducing speed and increasing torque of a second gear and/or of a shaft as compared to a speed and torque of the compressed air-driven motor and/or a compressed air-driven pump, the second gear and/or the shaft capable of being mechanically connected to the one or more gears.

7. The system of claim 6, wherein the second gear and/or shaft is capable of driving a pump for pumping a liquid.

8. The system of claim 1, wherein at least a portion of the energy harvested by the photovoltaic cell is configured to drive a pump for pumping a liquid.

9. The system of claim 1, further comprising a control valve configured as a mass-flow controller to regulate release of compressed gas from the compressed gas storage vessel to a turbo pump/motor comprising a turbine and a pump; wherein the pump is configured to supply pressurized feed water to a reverse osmosis desalination unit.

10. A method for movement of a liquid, the method comprising:

producing energy using a photovoltaic cell;

compressing a gas using a gas compressor powered by the energy;

storing the compressed gas in a compressed gas storage vessel;

moving a liquid by driving a compressed air-driven motor and/or a compressed air-driven pump using the compressed gas sourced from the compressed gas storage vessel; and cooling the photovoltaic cell by using a photovoltaic cell cooling unit comprising a clutch and a fan, wherein the fan is connected to the clutch, and wherein the photovoltaic cell cooling unit is driven by the compressed air-driven motor and/or the compressed air-driven pump and the clutch is capable of disconnecting the photovoltaic cell cooling unit from movement of the compressed air-driven motor and/or the compressed air-driven pump.

11. The method of claim 10, wherein the liquid is moved by the method in and/or into a desalination unit.

12. The method of claim 11, wherein the desalination unit comprises one or more forward osmosis membrane and/or reverse osmosis membrane.

13. The method of claim 10, wherein the clutch is capable of controlling speed of the fan.

14. The method of claim 10, further comprising one or more gears capable of being mechanically connected to the compressed air-driven motor and/or a compressed air-driven pump and reducing speed and increasing torque of a second gear and/or of a shaft as compared to a speed and torque of the compressed air-driven motor and/or a compressed air-driven pump, the second gear and/or the shaft capable of being mechanically connected to the one or more gears.

15. The method of claim 14, wherein the second gear and/or the shaft drives a pump to move a liquid.

16. The method of claim 10, wherein at least a portion of the energy produced by the photovoltaic cell drives a pump to move a liquid.

17. The method of claim 10, further comprising regulating release of the compressed gas from the compressed gas storage vessel using a control valve configured as a mass-flow controller to a turbo pump/motor comprising a turbine and a pump; wherein the pump supplies pressurized feed water to a reverse osmosis desalination unit.

18. A compressed gas turbo-pump system comprising:

a photovoltaic unit comprising a photovoltaic cell and a photovoltaic cell cooling unit, wherein the photovoltaic cell cooling unit comprises a clutch and a fan, and wherein the fan is connected to the clutch;

a gas compressor electrically connected to the photovoltaic cell, wherein energy harvested by the photovoltaic cell is capable of powering the gas compressor to compress gas;

a compressed gas storage vessel fluidly connected to the gas compressor, wherein compressed gas compressed by the gas compressor is capable of being stored in the compressed gas storage vessel, and wherein the compressed gas storage vessel is fluidly connected to the compressed gas inlet of a compressed gas turbo-pump;

the compressed gas turbo-pump comprising:

a compressed gas inlet;

a turbine fluidly connected to the compressed gas inlet; and a gas outlet fluidly connected to the turbine;

one or more gears capable of being mechanically connected to the turbine and reducing speed and increasing torque of a second gear and/or of a shaft as compared to a speed and torque of the turbine, the second gear and/or the shaft capable of being mechanically connected to the one or more gears; and a liquid pump capable of being driven by the movement of the second gear and/or the shaft, wherein the photovoltaic cell cooling unit is capable of being driven by movement of the turbine, the one or more gears, the second gear, and/or the shaft, and wherein the clutch is capable of disconnecting the photovoltaic cell cooling unit from the turbine, the one or more gears, the second gear, and/or the shaft.

19. The compressed gas turbo-pump system of claim 18, wherein the clutch can control speed of the fan.

20. The compressed gas turbo-pump system of claim 18, further comprising a control valve configured as a mass flow controller to regulate release of compressed gas from the compressed gas storage vessel to the compressed gas turbo-pump, wherein the liquid pump is configured to supply pressurized feed water to a reverse osmosis desalination unit.

* * * * *